US012586378B2

(12) United States Patent
Lidlgruber Agertoft

(10) Patent No.: US 12,586,378 B2
(45) Date of Patent: Mar. 24, 2026

(54) METHODS OF VIDEO SURVEILLANCE, NON-TRANSITORY COMPUTER READABLE STORAGE MEDIA STORING COMPUTER PROGRAMS, AND VIDEO SURVEILLANCE SYSTEMS

(71) Applicant: MILESTONE SYSTEMS A/S, Brøndby (DK)

(72) Inventor: Jais Lidlgruber Agertoft, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 110 days.

(21) Appl. No.: 18/484,318

(22) Filed: Oct. 10, 2023

(65) Prior Publication Data

US 2024/0119738 A1    Apr. 11, 2024

(30) Foreign Application Priority Data

Oct. 11, 2022    (GB) ..................................... 2214968

(51) Int. Cl.
$G06V$ 20/52        (2022.01)
$G06T$ 5/70        (2024.01)
$H04N$ 21/431      (2011.01)
$H04N$ 21/81       (2011.01)

(52) U.S. Cl.
CPC ............... G06V 20/52 (2022.01); G06T 5/70 (2024.01); H04N 21/4318 (2013.01); H04N 21/8133 (2013.01)

(58) Field of Classification Search
None
See application file for complete search history.

(56) References Cited

U.S. PATENT DOCUMENTS

| | | | | |
|---|---|---|---|---|
| 11,659,137 B1* | 5/2023 | Parampottil | .............. | G06T 5/75 |
| | | | | 348/14.12 |
| 12,148,512 B2* | 11/2024 | Bechtel | .................. | G16H 50/30 |
| 2010/0033566 A1 | 2/2010 | Drive | | |
| 2011/0085034 A1 | 4/2011 | Mcdonald | | |
| 2014/0225921 A1 | 8/2014 | Bruhn | | |
| 2016/0050450 A1 | 2/2016 | M | | |
| 2018/0330591 A1 | 11/2018 | Tilkin | | |
| 2019/0304284 A1* | 10/2019 | Takeuchi | ............. | A61B 5/0013 |
| 2024/0048839 A1* | 2/2024 | Pujari | ................... | H04N 23/80 |

FOREIGN PATENT DOCUMENTS

| | | | |
|---|---|---|---|
| FR | 3114418 A1 | 3/2022 | |
| GB | 2569572 A | 6/2019 | |
| GB | 2600477 A | 5/2022 | |
| JP | 2009135683 A | 6/2009 | |
| JP | 2013251784 A | 12/2013 | |
| WO | 2011059659 A1 | 5/2011 | |

* cited by examiner

*Primary Examiner* — Omar S Parra
(74) *Attorney, Agent, or Firm* — Canon U.S.A., Inc. IP Division

(57)                ABSTRACT

The present disclosure aims to allow users such as Health Care Personnel, nurses or more generally speaking video surveillance operators to blur video surveillance data and/or attach content such as comments or notes to video surveillance data at a client-level.

9 Claims, 9 Drawing Sheets

S200 causing an instance of a video management system client application software to display live video data received from at least one server, the live video data being generated by a plurality of video surveillance cameras

S210 causing live video data from at least one of the video cameras to be blurred in that instance of the software upon receipt of, in that instance of the software, a blurring instruction associated with the said at least one of the video cameras and/or the video data of the said at least one of the video cameras

FIGURE 2

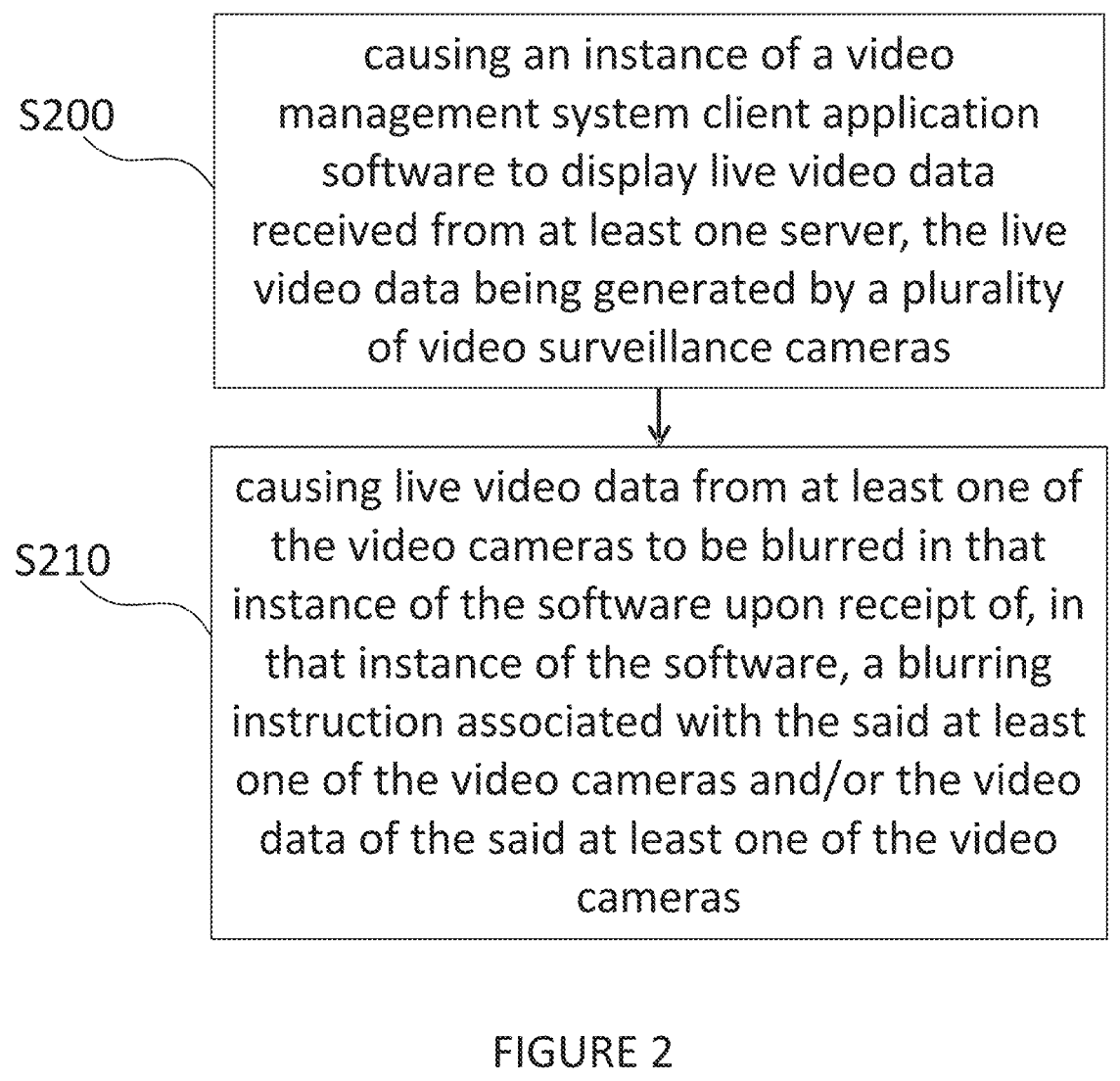

S300 causing an instance of a video management system client application software to display live video data received from at least one server, the live video data being generated by a plurality of video surveillance cameras

S310 causing a new note field or part thereof to be displayed with live video data from at least one of the video cameras in that instance of the software upon receipt of, in that instance of the software, an instruction to record a new note associated with the said at least one of the video cameras and/or their video data

FIGURE 3

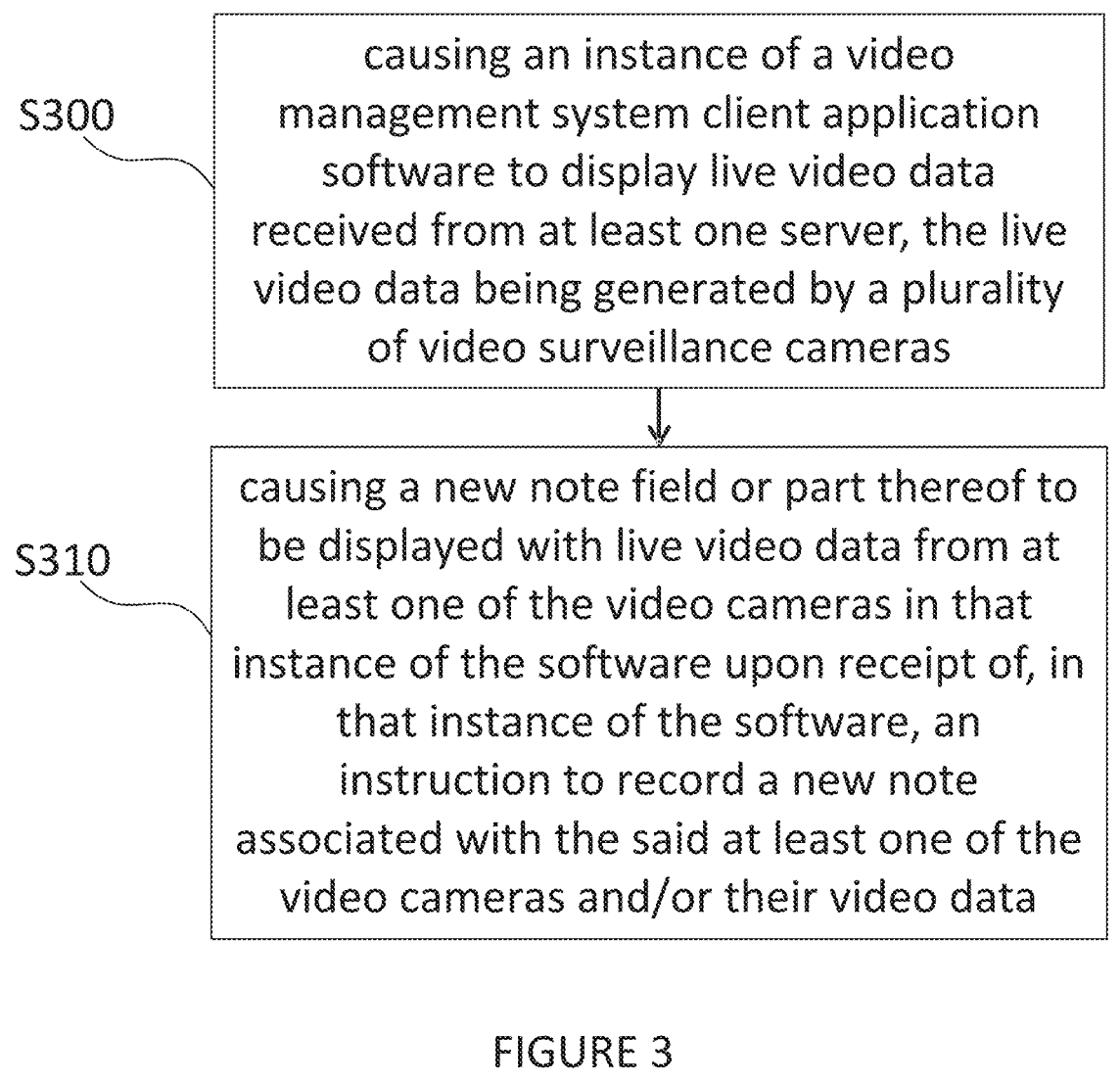

METHODS OF VIDEO SURVEILLANCE, NON-TRANSITORY COMPUTER READABLE STORAGE MEDIA STORING COMPUTER PROGRAMS, AND VIDEO SURVEILLANCE SYSTEMS

CROSS-REFERENCE TO RELATED APPLICATION

This application claims the benefit under 35 U.S.C. § 119(a)-(d) of United Kingdom Patent Application No. 2214968.6, filed on Oct. 11, 2022 and titled "METHODS OF VIDEO SURVEILLANCE, COMPUTER PRO-GRAMS, STORAGE MEDIA AND VIDEO SURVEIL-LANCE SYSTEMS". The above cited patent application is incorporated herein by reference in its entirety.

BACKGROUND

The present disclosure relates to methods of video sur-veillance, computer programs for carrying out the said methods, computer-readable data carriers (storage media) having stored thereon the said programs and video surveil-lance systems. The present disclosure particularly relates to providing new capabilities to existing video management system client application software.

A video management system (VMS) typically receives video data from a plurality of surveillance cameras. The video management system may store the data in a recording server and carry out image processing or analytics, and transmit the video data to a client device (or client apparatus) which may be a mobile device or an operator console including a display where it is viewed by an operator. The video management system may also carry out control relat-ing to the storage and deletion of the video data.

The video management system may also receive com-mands from the user, from the client device. The commands may include commands to remotely control video cameras connected to the video management system such as pan-tilt-zoom (PTZ) video cameras. The commands may also include commands to the video management system which control which data is sent to the client device for display. For example, the operator can control which video cameras' data is sent from the video management system to the display so that the operator can select which video cameras to view data from.

The operator's display may display only data from one video camera at any one time. However, video data from multiple cameras may be displayed simultaneously in mul-tiple windows of an interface (e.g. in multiple panes or child windows inside a parent window, also called viewing frames), with video from a selected camera preferably displayed in a relatively larger view than the other cameras. Accordingly, the client device can receive one stream of video data or multiple streams.

Video surveillance is often carried out in real time, with an operator tracking physical objects, people and/or moni-toring events of interest as they happen.

Contrary to the usual VMS paradigm focusing on secur-ing and storing video evidence, video data in a patient-monitoring environment is seen by the Health Care Person-nel (HCP) as a real-time aid to quickly look at patient rooms. The respect of private life of patients and employees is key.

Nurses in hospitals need to have an overview of multiple patient rooms at the same time which is, for example, possible with the XProtect® video management software from Milestone Systems. The HCP needs a feature which allows some level of privacy when a patient is, for instance, being washed by the HCP, or needs privacy for other purposes.

XProtect® has an implementation where a blurring mask can be configured on a video management server and lifted on the XProtect® Smart Client application software, pro-vided the user of the client application software has been granted the necessary user rights. However, this solution is not suitable for the HCP or nurses who need to have control over what needs to be blurred in real-time. Blurring on a server side also requires analytics to identify events and/or persons to be blurred, and such analytics may fail. Updating the analytics and/or rules governing the analytics to new scenarios, people and/or events to be blurred also adds an additional layer of complexity to such a system. Allowing HCP to blur camera views also poses a risk to the patient if blurring is not lifted in due time (for instance, if a nurse forgets to remove the blurring).

The HCP further need a software feature which allows them to add information about the patients they are moni-toring. This is needed as it can be difficult to remember which patient is in which room, for instance if there are newcomers since the nurses' last work shift, or if there is something in particular to be aware of. To meet this goal, some nurses choose to modify a displayed camera name so as to display relevant information. However, this is a com-plex methodology and the risk of losing important configu-rations is significant, for instance, if the camera name is used by another part of the software such as a plugin. Moreover, the management client is intended for the system integrator to operate in, not the actual end-user (nurses).

Thus, there is a need to optimise the current methods of surveillance and corresponding systems and programs, and to provide software with new capabilities.

BRIEF SUMMARY

The present disclosure aims to address at least some of the above-mentioned issues.

To this aim, the present disclosure aims to allow users (such as HCP, nurses or more generally speaking video surveillance operators) to blur video surveillance data and/or attach content (such as comments or notes) to video sur-veillance data at a client-level, while minimising the risk of misuse of such new capabilities by the users of the video management system, and also while facilitating the surveil-lance being done by the users.

The present disclosure is particularly applicable to the field of video surveillance, and more particularly to the field of patient monitoring.

A first aspect of the present disclosure relates to a method of video surveillance comprising the steps of: causing an instance of a video management system client application software to display live video data received from at least one server, the live video data being generated by a plurality of video surveillance cameras; and causing live video data from at least one of the video cameras to be blurred in that instance of the software upon receipt of, in that instance of the software, a blurring instruction associated with the said at least one of the video cameras and/or the video data of the said at least one of the video cameras.

Optionally, the method further comprises the step of: causing the said instance of the software to automatically revert to displaying non-blurred live video data from the said at least one of the video cameras when a predetermined time period has expired.

Optionally, the method further comprises the step of: setting or changing the predetermined time period, wherein the step of setting or changing the predetermined time period requires permission rights that are different from those required to send the said blurring instruction.

Optionally, the method further comprises the step of: manually reverting to displaying non-blurred live video data from the said at least one of the video cameras before the predetermined time period elapses.

Optionally, in the method, the blurring instruction indicates a desired level of blurring.

Optionally, the method further comprises the step of: causing the said instance of the software to display a preview of blurred video data corresponding to the desired level of blurring which is being selected.

Optionally, the method further comprises the step of: logging on an entry in a log of the blurring instruction.

Optionally, the method further comprises the step of: reading or modifying the said log, wherein reading or modifying the said log requires permission rights that are different from those required to send the said blurring instruction.

Optionally, in the method, the log is stored in a video management server that is located between the plurality of video cameras and a computer running the said instance of a video management system client application software.

Optionally, the method further comprises the step of: recording the live video data from the video cameras in a non-blurred format in one or more recording servers, irrespective of the blurring instruction.

A second aspect of the present disclosure relates to a method of video surveillance comprising the steps of: causing an instance of a video management system client application software to display live video data received from at least one server, the live video data being generated by a plurality of video surveillance cameras; and causing a new note field or part thereof to be displayed with live video data from at least one of the video cameras in that instance of the software upon receipt of, in that instance of the software, an instruction to record a new note associated with the said at least one of the video cameras and/or their video data.

Optionally, in the method, causing a new note field or part thereof to be displayed comprises the step of: overlaying the said live video data from at least one of the video cameras with the said new note field or part thereof.

Optionally, in the method, the said new note field or part thereof is semi-transparent such that at least part of the live video data behind the new note field or part thereof remains visible to a user of the video management system client application software.

Optionally, in the method, the instruction indicates a level of importance and/or a background color for the said new note field or part thereof.

Optionally, the method further comprises the step of: logging on an entry in a log of the instruction.

Optionally, the method further comprises the step of: editing or deleting the new note field or part thereof.

Optionally, the method further comprises the step of: logging on an entry in the log of the editing or deleting step.

Optionally, the method further comprises the step of: storing the log in a video management server that is located between the plurality of video cameras and a computer running the said instance of a video management system client application software.

Optionally, the method further comprises the step of: storing the said new note in the video management server.

A third aspect of the present disclosure relates to a video management system client application software comprising instructions which, when executed by a computer, cause the computer to: display live video data received from at least one server, the live video data being generated by a plurality of video surveillance cameras; and blur live video data from at least one of the video cameras in that instance of the software upon receipt of, in that instance of the software, a blurring instruction associated with the said at least one of the video cameras and/or the video data of the said at least one of the video cameras.

A fourth aspect of the present disclosure relates to a video management system client application software comprising instructions which, when executed by a computer, cause the computer to: display live video data received from at least one server, the live video data being generated by a plurality of video surveillance cameras; and display a new note field or part thereof with live video data from at least one of the video cameras in that instance of the software upon receipt of, in that instance of the software, an instruction to record a new note associated with the said at least one of the video cameras and/or their video data.

A fifth aspect of the present disclosure further relates to a non-transitory computer-readable storage medium storing a program for causing a computer to execute a computer-implemented method of video surveillance comprising the steps of: causing an instance of a video management system client application software to display live video data received from at least one server, the live video data being generated by a plurality of video surveillance cameras; and causing live video data from at least one of the video cameras to be blurred in that instance of the software upon receipt of, in that instance of the software, a blurring instruction associated with the said at least one of the video cameras and/or the video data of the said at least one of the video cameras.

A sixth aspect of the present disclosure further relates to a non-transitory computer-readable storage medium storing a program for causing a computer to execute a computer-implemented method of video surveillance comprising the steps of: causing an instance of a video management system client application software to display live video data received from at least one server, the live video data being generated by a plurality of video surveillance cameras; and causing a new note field or part thereof to be displayed with live video data from at least one of the video cameras in that instance of the software upon receipt of, in that instance of the software, an instruction to record a new note associated with the said at least one of the video cameras and/or their video data.

A seventh aspect of the present disclosure further relates to a video surveillance system configured to carry out a method according to the first aspect, the system comprising the said plurality of video cameras, a computer running the said video management system client application software and the said at least one server.

An eighth aspect of the present disclosure further relates to a video surveillance system configured to carry out a method according to the second aspect, the system comprising the said plurality of video cameras, a computer running the said video management system client application software and the said at least one server.

BRIEF DESCRIPTION OF THE DRAWINGS

Embodiments of the present disclosure will now be described, by way of example only, with reference to the accompanying drawings in which:

5
6

Figure 1:
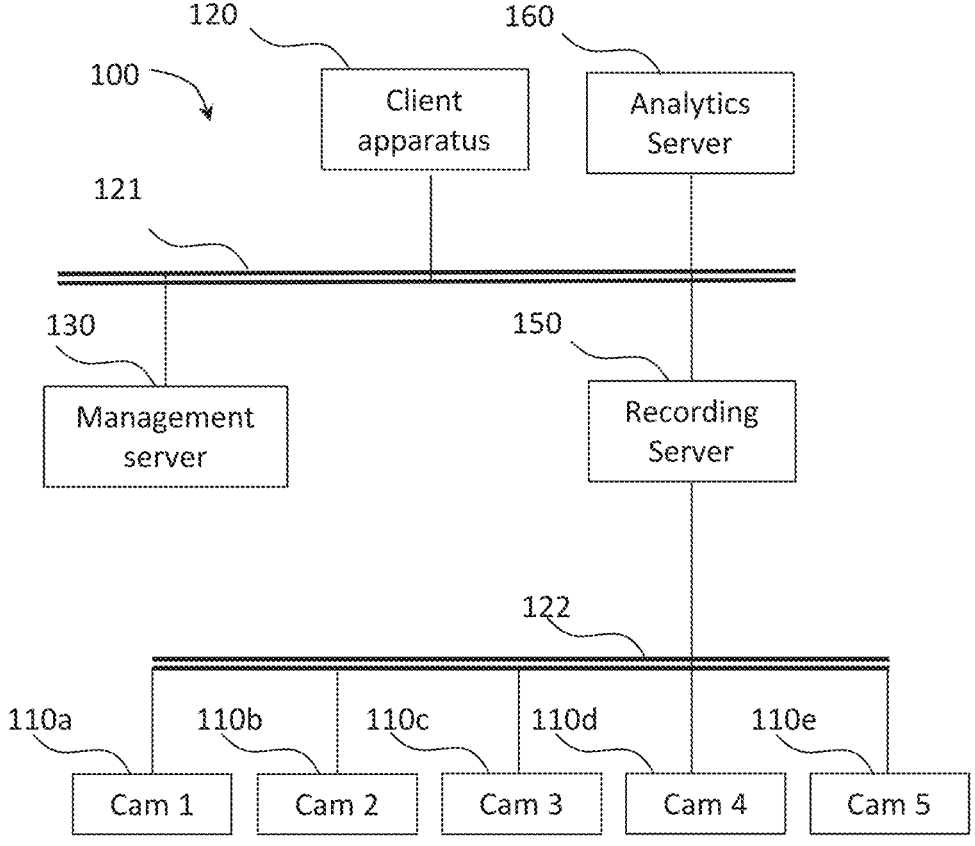
Figure 4A:
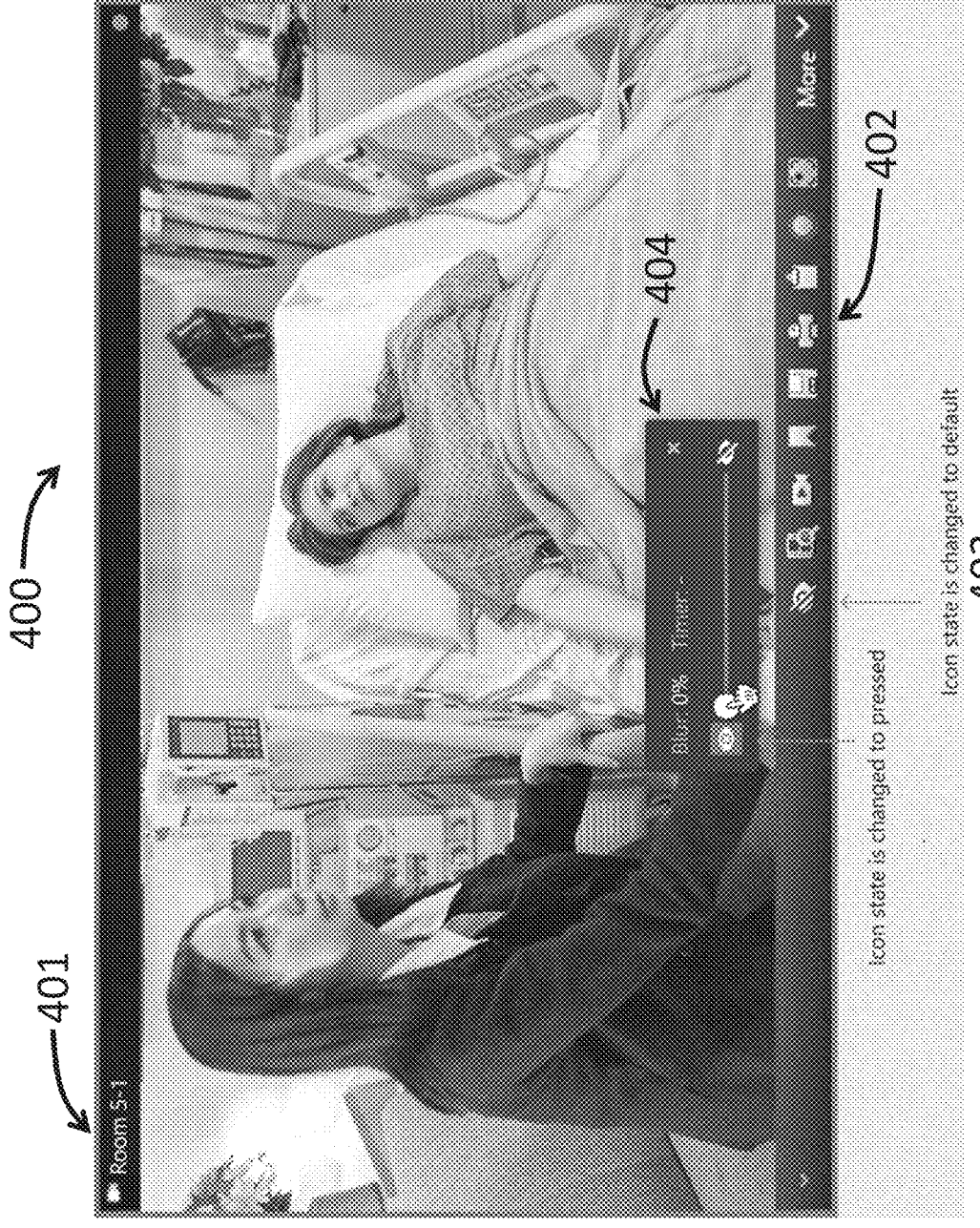
Figure 4B:
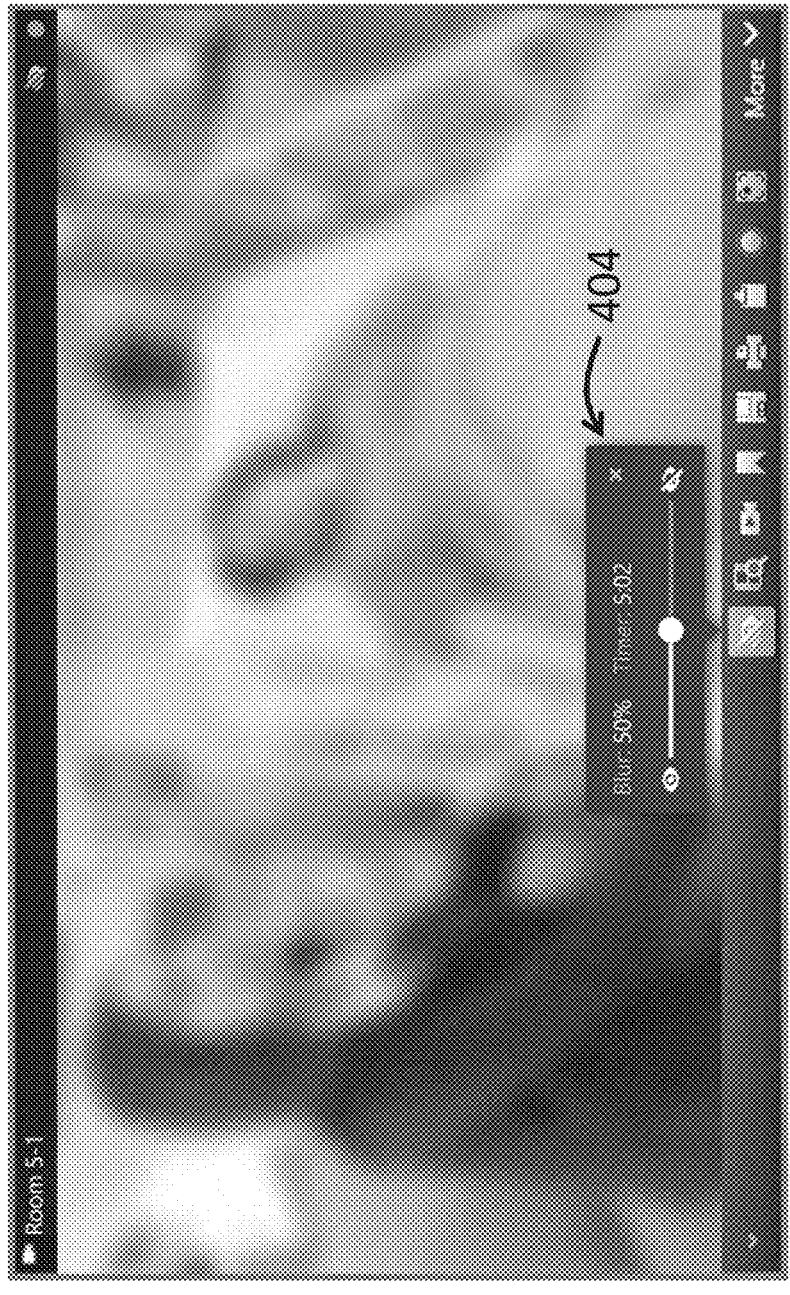

FIG. 1 illustrates an example of a video surveillance system implementing the present disclosure;

FIG. 2 is a flowchart illustrating the essential steps of a method of video surveillance according to the first aspect of the present disclosure;

FIG. 3 is a flowchart illustrating the essential steps of a method of video surveillance according to the second aspect of the present disclosure;

FIGS. 4A to 4B are examples of views displayed in the video management system client application software according to the first aspect of the present disclosure.

FIGS. 5A to 8 are examples of views displayed in the video management system client application software according to the second aspect of the present disclosure.

DETAILED DESCRIPTION

FIG. 1 shows an example of a video surveillance system 100 in which embodiments of the present disclosure can be implemented. The system 100 comprises a (video) management server 130, a recording server 150 and an analytics server 160. Further servers may also be included, such as further recording servers, archive servers, indexing servers or analytics servers. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. Also, a mobile server (not illustrated) may be provided to allow access to the surveillance/monitoring system from mobile devices, such as a mobile phone hosting a mobile client or a laptop accessing the system from a browser using a web client. A dedicated analytics server can also run analytics software for image analysis, for example motion or object detection, facial recognition, and/or event detection (detection of activity). In the present disclosure, analytics application programs may run on such a dedicated analytics server 160, which can be cloud-based such as in document EP4002853A1 (whose content is hereby incorporated by reference). Additionally and/or alternatively analytics application programs may run "on premises", e.g. in surveillance devices (such as in the video cameras in the surveillance area which can, for example, run an operating system allowing an administrator and/or superuser to install analytics programs suitable for monitoring the area). The analytics application programs may also run in a video management system (VMS), which can be a management software or a client application software. The present disclosure is not limited to any particular location of the analytics application programs and to any particular analytics application programs.

A plurality of video surveillance cameras 110a-110e (five video cameras in this particular example) send video data (e.g. live video streams) to the recording server 150. An operator client 120 provides an interface via which an operator can view live video streams from the video cameras 110a-110e, or recorded video data from the recording server 150. The video cameras 110a-110e capture image data and send this to the recording server 150 as a plurality of video streams. The recording server 150 stores the video streams captured by the video cameras 110a-110e.

According to a preferred embodiment of the present disclosure, some or none of the fields of view of the video cameras overlap, thus allowing to monitor a larger portion of the physical area under surveillance. Since the present disclosure allows to optimise the current methods of surveillance and corresponding systems by limiting the amount of computational and human resources they require for operating, efficient tracking and/or monitoring of an object and/or event may be achieved with less surveillance sensors (e.g. video cameras). The video cameras may thus be put further away from each other with little or no overlap between their fields of view, therefore allowing to optimise the number of video cameras required.

The management server 130 includes management software for managing information regarding the configuration of the surveillance/monitoring system 100 such as conditions for alarms, details of attached surveillance devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the video cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

The operator client 120 is provided for use by an operator (such as a security guard or other user) in order to monitor or review the outputs of the video cameras 110a-110e. The operator client 120 may be a fixed console or could be a mobile device connected to the video management system via a network. The operator client 120 runs a VMS client application software and includes a display which can display an interface for interacting with the management software on the management server 130. The operator client 120 can request video data streams from one or more of the video cameras 110a-110e to view video streams in real time, or the operator client 120 can request recorded video data stored in the recording server 150. According to a preferred embodiment of the present disclosure, the video being captured by one of the video cameras as a selected video stream is displayed in a main window, with video streams captured by other video cameras being displayed in smaller windows. In this case, multiple video streams are sent to the operator client 120. In the case of a system with a large number of cameras, even a large display may not be able to show the video streams from all of the video cameras, only a selection. Alternatively, the operator client 120 may be arranged to show the video stream being captured by only one of the video cameras 110a-110e as a selected video stream on its display. In this case, only one video stream is sent to the operator client 120, this being the stream from the selected camera.

The operator client may also be connected with an incident response system that can receive commands from the operator to remotely close doors, set or change access control rights, prevent or allow access to certain zones of the physical area, set traffic lights, trigger an alarm or control any devices configured to be remotely controlled via the incident response system. Note that the commands can be security related, emergency related or operations related.

The operator client 120 is configured to communicate via a first network/bus 121 with the management server 130 and the recording server 150 and the video cameras 110a, 110b, 110c. The recording server 150 communicates with the video cameras 110*a*, 110*b*, 110*c* via a second network/bus 122. The recording server 150 is configured so as to stream video streams from the video cameras 110*a*-110*e* to the operator client 120.

The video surveillance system of FIG. 1 is an example of a system in which the present disclosure can be implemented. However, other architectures are possible. For example, the system of FIG. 1 is a system partly running on premises and partly running in the cloud, but the present disclosure can also be implemented in a cloud-based system. In a cloud-based system, the video cameras stream data to the cloud, and at least the recording server 150 is in the cloud. Additionally, video analytics may be carried out in the cloud. The client apparatus requests the video data to be viewed by the user from the cloud. The system may also be configured as a hybrid system where, for instance, the data is archived on a cloud-based archive server after having been recorded on an on-premises recording server. Alternatively, an on-premises server may buffer the video data before moving it to a cloud-based recording server.

FIG. 2 is a flowchart illustrating a computer-implemented method according to the first aspect of the present disclosure, which comprises two essential steps. In a first step S200, the computer will cause an instance of the video management system client application software to display live video data received from at least one server (e.g. the recording server 150 of FIG. 1), the live video data being generated by a plurality of video surveillance cameras (e.g. the video cameras 110*a*-110*e* of FIG. 1).

Within the context of the present disclosure, the term "video management system client application software" should be understood to mean one or more computer programs to be run on a client-side (i.e. as a client application software).

Within the context of the present disclosure, the term "live video data" should be understood to mean video data captured in real-time and sent in real-time or quasi-real time (e.g. with a delay of less than 1 minute) to the video management system client application software.

Note that the present disclosure does not intend to limit the use, on other computers or devices, of other instances of the same client application software (and other client application software). In other words, different instances of the same client application software may operate differently, as long as at least one of them runs according to the present disclosure.

Although the present disclosure particularly relates to the field of video surveillance and medical observation (such as patient monitoring), other typical purposes for monitoring video streams may be documentation, building management, production, traffic control and/or process control.

The signals, data streams and analytics data generated by the video cameras, surveillance devices and/or sensors can be segmented into data segments of manageable sizes in order to be stored on recording servers. The signals, data streams and analytics data can then be retrieved from the recording servers for live or playback streaming for viewing and/or analysis at a client side.

The second step S210 of the method according to the first aspect of the present disclosure comprises causing live video data from at least one of the video cameras to be blurred in that instance of the software upon receipt of, in that instance of the software, a blurring instruction associated with the said at least one of the video cameras and/or the video data of the said at least one of the video cameras.

The present disclosure is not limited to any particular kind of blurring. Blurring may be achieved through any method known to the skilled person, for instance, by applying a blurring filter to the live video data or by moving pixels from their original positions to different positions in the displayed image. Blurring may also be achieved by overlaying, in the client application software, a blurring mask on the live video stream to be blurred, without modifying the live video stream itself.

The present disclosure is not limited to any particular kind of format for the blurring instruction, although it will be understood that a user-friendly user interface (UI) with pre-programmed click buttons, sliders and the like, is preferable. For instance, a click button allowing a user to send a blurring instruction is preferable.

According to the first aspect of the present disclosure, the blurring instruction is associated with one or more video cameras and/or its/their video streams (or otherwise with respective viewing frames showing such video streams). Preferably, each window displaying a respective video stream also displays a click button allowing a user to blur the content of the video stream displayed in that window.

Within the context of that part of the present disclosure, the term "upon receipt" should be understood to mean that the blurring is enabled as soon as practicable or shortly after receipt of the instruction.

Preferably, according to the present disclosure, the client application software automatically reverts to displaying non-blurred live video data from the said at least one of the video camera which has been blurred, when a predetermined time period has expired. Thus, even if a user forgets or chooses not to disable the blurring in due time, the client application software will do it automatically for them. This achieves a balance between protecting the privacy of a patient for a certain time and preventing accidents occurring due to non-surveillance of the patient's room for too long.

The predetermined time period is preferably chosen and enforced by an administrator of the video surveillance system. Thus, setting or changing the predetermined time period may require permission rights that are different from those required to send the said blurring instruction. For instance, setting or changing the predetermined time period may require administrator or super-user rights or be changeable only in a video management server, which is not configurable from the client application software with regular user rights.

This predetermined time period may be chosen on a case-by-case basis, but may be for instance of 5 mins 30 s for patient monitoring.

As the blurring instruction is sent by a user, the user may nevertheless retain the option to disable the blurring before the expiry of the predetermined period. Thus, the user may manually revert to displaying non-blurred live video data from the said at least one of the video cameras before the predetermined time period elapses. This is because the user may detect in advance that blurring is no longer necessary.

Preferably, according to the present disclosure, the blurring instruction may include an indication of a desired level of blurring. This is because a predefined level of blurring may not achieve the same effect with different video cameras (in particular if the video resolution is high, a higher level of blurring will be required as compared to a video camera having a lower video resolution), but also depending amongst other things on the lighting conditions in the patient's room and the settings of the video camera itself. Thus, it is preferable if the user is allowed to set a custom level of blurring that will meet their need. This level of blurring may be expressed as a percentage. For instance, 0% may correspond to an absence of blurring and 100% may correspond to a maximum level of blurring achievable through the software. Alternatively, 100% may correspond to a predetermined maximum of blurring.

Preferably, according to the present disclosure, the client application software displays a preview of blurred video data corresponding to the desired level of blurring which is being selected. This preview may be displayed so as to allow the user to see the real-time (or a quasi-real time) effect of the blurring in a preview window. Alternatively, the blurring may be shown in the same window (or otherwise viewing frame) as that showing the original video stream to be blurred.

Preferably, according to the present disclosure, any blurring instruction is logged on as an entry in a log. Thus, in the event of an incident occurring when the blurring is activated, it may be possible to investigate why the blurring was activated during that time with a responsible user. The log entry preferably contains full particulars about the user who sent the blurring instruction, if desirable, and a timestamp. A log entry may also be recorded for when the user manually disables the blurring, or for when the client application software automatically reverts to a non-blurred video stream. Different logs may also be used for that purpose, for instance, one log per user or one log per kind of entry.

Preferably, according to the present disclosure, reading and/or modifying the said log may require permission rights that are different from those required to send the said blurring instruction, e.g. administrator or super-user rights, or be changeable only in a video management server, which is not configurable from the client application software with regular user rights.

Preferably, according to the present disclosure, the log is stored in a video management server that is located between the plurality of video cameras and a computer running the said instance of a video management system client application software, such as in the management server 130 described above, that is located between the plurality of video cameras 110a-110e and a computer (client apparatus 120) running the said instance of the client application software.

Preferably, according to the present disclosure, the live video data is recorded in a non-blurred format in one or more recording servers, such as the recording server 150 described above, irrespective of the blurring instruction. Thus, in the event of an incident in the patient's room while the room was blurred on the display, an administrator, super-user or user may be able to see what actually happened at a later stage, on the recording.

The present disclosure, in its third aspect, provides a video management system client application software configured to run as per any one of the above-mentioned embodiments. Such a software is in particular configured to display multiple video streams, and act upon instructions (such as the blurring instruction) received from a user.

The present disclosure, in its fifth aspect, provides a computer-readable data carrier having stored thereon the said video management system client application software. This carrier may be in the form of an HDD, SSD, USB flash drive or the like.

The present disclosure, in its seventh aspect, provides a video surveillance system comprising a plurality of video cameras, a computer (such as the client apparatus 120 mentioned above) running the said video management system client application software and at least one server (such as the recording server 150 mentioned above).

FIG. 3 is a flowchart illustrating a computer-implemented method according to the second aspect of the present disclosure, which comprises two essential steps. The first step S300 is identical to the step S200 shown in FIG. 2 and described above.

The second step S310 of the method according to the second aspect of the present disclosure comprises causing a new note field or part thereof to be displayed with live video data from at least one of the video cameras in that instance of the software upon receipt of, in that instance of the software, an instruction to record a new note associated with the said at least one of the video cameras and/or their video data.

Here again, the present disclosure is not limited to any particular kind of format for the instruction to record a new note, although it will be understood that a user-friendly user interface (UI) with pre-programmed click buttons, sliders and the like, is preferable. For instance, a click button allowing a user to create a new note is preferable.

According to the second aspect of the present disclosure, the instruction to record a new note is associated with one or more video cameras and/or its/their video streams (or otherwise with respective viewing frames showing such video streams). Preferably, each window displaying a respective video stream also displays a click button allowing a user to create a new note for the video stream displayed in that window.

Within the context of that part of the present disclosure, the term "upon receipt" should be understood to mean that the new note or part thereof is displayed as soon as practicable or shortly after receipt of the instruction.

Within the context of the present disclosure, the term "a new note field" should be understood to mean a note field that didn't exist prior to the instruction to record a new note.

Preferably, any such new note fields may be stacked below a text field displaying the name of a video camera corresponding to the video stream for which the note is or are to be added. This facilitates identification of which notes relate to that particular video camera and optimises use of the screen real estate.

Preferably, the new note field is displayed overlayed on top of live video data related to this new note. This further facilitates identification of which notes relate to that particular video camera while minimising an amount of screen real estate required to display the new notes. In such a case, the said new note field or part thereof is preferably semi-transparent such that at least part of the live video data behind the new note field or part thereof remains visible to a user of the video management system client application software.

Preferably, the instruction to record a new note may comprise a level of importance and/or a background color for the said new note field or part thereof. In other words, the new note may be displayed in one of several colors, each color respectively corresponding to different categories of notes, for instance, such that the notes may be categorised. For instance, a first color may correspond to notes that relate to critical information required for patient care and a second color may correspond to particular requests from patients.

Preferably, according to the present disclosure, any instruction to record a new note is logged on as an entry in a log. Thus, in the event of an incident occurring due to wrong information being entered, it may be possible to investigate who entered that information. The log entry preferably contains full particulars about the user who sent the instruction to record a new note, if desirable, and a timestamp. A log entry may also be recorded for when the user instructs the client application software to delete a note, note field or part thereof.

Preferably, according to the present disclosure, reading and/or modifying the said log may require permission rights that are different from those required to send the said blurring instruction, e.g. administrator or super-user rights, or be changeable only in a video management server, which is not configurable from the client application software with regular user rights.

Preferably, according to the present disclosure, the log is stored in a video management server that is located between the plurality of video cameras and a computer running the said instance of a video management system client application software, such as in the management server 130 described above, that is located between the plurality of video cameras 110*a*-110*e* and a computer (client apparatus 120) running the said instance of the client application software.

Preferably, according to the present disclosure, any new such notes may be stored in the video management server. This allows to communicate the notes to different instances of the client application software, as need be.

Preferably, according to the present disclosure, any such new note fields may be edited and/or deleted, as requested by a user of the client application software.

The present disclosure, in its fourth aspect, provides a video management system client application software configured to run as per any one of the above-mentioned embodiments. Such a software is in particular configured to display multiple video streams, and act upon instructions (such as the instruction to record a new note) received from a user.

The present disclosure, in its sixth aspect, provides a computer-readable data carrier having stored thereon the said video management system client application software. This carrier may be in the form of an HDD, SSD, USB flash drive or the like.

The present disclosure, in its eight aspect, provides a video surveillance system comprising a plurality of video cameras, a computer (such as the client apparatus 120 mentioned above) running the said video management system client application software and at least one server (such as the recording server 150 mentioned above).

FIG. 4A shows a window or viewing frame 400 displaying a live video stream from a patient's room in the client application software. The window includes a text field showing a room name 401 and a tool bar 402 comprising a plurality of pre-programmed click buttons for instructing the client application software to perform various functions.

In this example, the tool bar 402 comprises an icon 403 allowing a user of the client application software to send a blurring instruction. When the user presses the icon 403, a pop-up window 404 opens up and displays a slider allowing the user to adjust a desired level of blurring. A value corresponding to a current level of blurring may be displayed, for instance, 0% in FIG. 4A and 50% in FIG. 4B. The default value may be set to any value, but preferably to an intermediate value of 50% which may suit most use cases. The pop-up window 404 may display a timer showing the above-described predetermined time period, e.g. 5 mins 2 s in FIG. 4B. The timer may be displayed as soon as the pop-up window 404 opens up as in FIG. 4B. Alternatively, the timer may be displayed upon selection of a desired level of blurring by the user.

The client application software may display a preview of the blurred video stream as in FIG. 4B, corresponding to the desired level of blurring. The preview will then become the actual blurred view upon closure of the pop-up window 404.

The user then has the possibility, before the expiry of the predetermined time period, to manually remove the blurring, for instance, by reopening the pop-up window 404 by pressing on the icon 403, and then pulling the slider to a desired level of blurring of 0%. Alternatively, the pop-up window 404 may include a dedicated click button (not shown) to remove the blurring.

Although the FIGS. 4A and 4B only show a single video stream, for the purpose of better describing the present disclosure, it is to be understood that the client application software receives a plurality of video streams from different video cameras (via a server), and that the user is able to blur them individually (or at least some of them individually). It will also be appreciated that the present disclosure is not limited to the particular graphical elements 401 to 404 represented in FIGS. 4A and 4B.

Figure 5A:
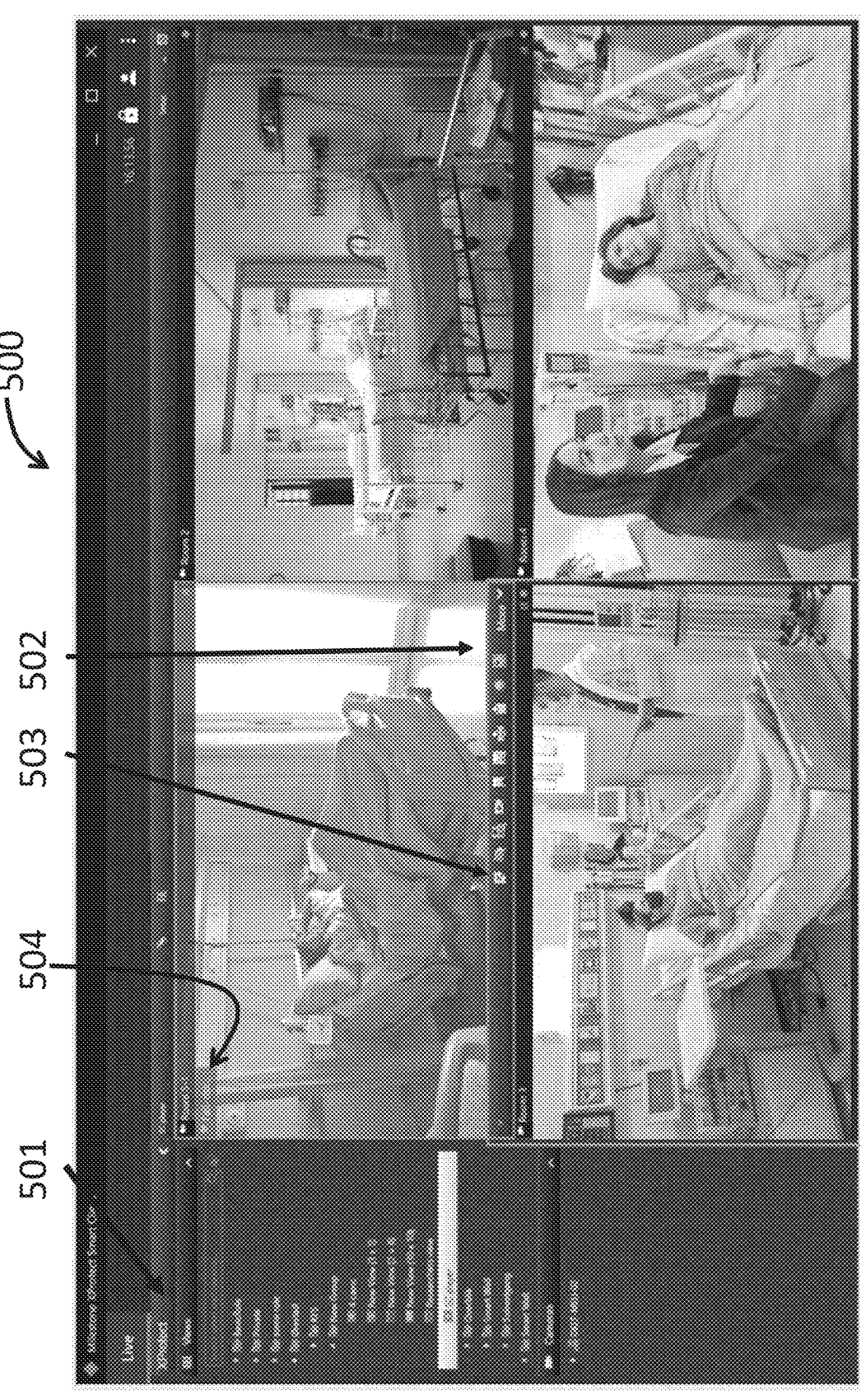

FIG. 5A shows a main window 500 of the video management system client application software displaying four viewing frames, i.e. four video streams from four video cameras in the hospital. The main window includes a left pane 501 allowing the user to select different video cameras or video streams thereof, and/or to change the layout of the main window 500. The user can also click on the different viewing frames displayed in the main window 500 to select them individually.

In the example of FIG. 5A, the user has selected the top left viewing frame, which has the effect of displaying a tool bar 502 similar to the toolbar 402 described above with reference to FIGS. 4A and 4B.

Figure 5B:
Figure 6:

In this example, the tool bar 502 comprises an icon 503 allowing a user of the client application software to create a new note. When the user presses the icon 503, a pop-up window as shown in FIG. 6 opens up which allows the user to create a new note. Upon confirming the creation of the note by clicking a confirm button, an instruction to record the new note is sent to the client application software, which then displays the note in a new note field 504' as shown in FIG. 5B, or only part of the note field 504 as shown in FIG. 5A. Whether to display the note field in full or in part may be determined by an administrator, and/or may be based on considerations such as how much screen real estate is available.

The pop-up window of FIG. 6 thus comprises a text field allowing the user to input the note (e.g. a note up to 140 characters) and preferably also comprises an interface (e.g. a drop-down menu) to input a level of importance and/or a background color for the said new note field or part thereof. The user may have the option to cancel the creation of the note (that is, not sending the instruction to record a note by clicking on, for example, a cancel button and/or by closing the pop-up window of FIG. 6.

Upon receipt of the instruction to record the new note, a new note field is added to the relevant viewing window, such as the new note fields 504, 504'.

Any such new note fields may include buttons 505 as shown in FIG. 5B, that is, for instance, a first button to edit the note and a second button to expand or collapse the note field on the display.

Figure 7:
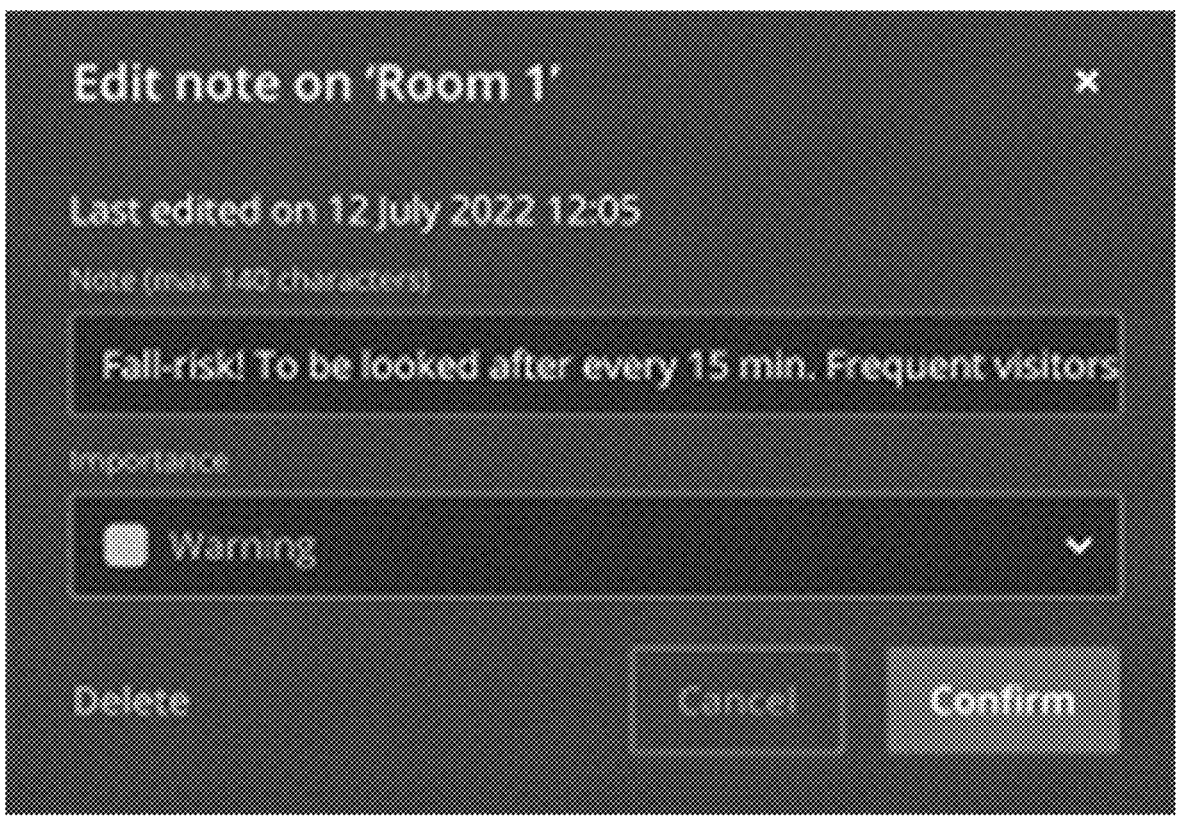

Preferably, upon clicking on the said first button to edit the note, an edit window such as the pop-up window shown in FIG. 7 opens up. This edit window substantially resembles the pop-up window of FIG. 6, but also displays a date on which the note was last edited and a delete button. Editing the note will update the note field 504, 504' shown in FIGS. 5A and 5B accordingly.

Figure 8:
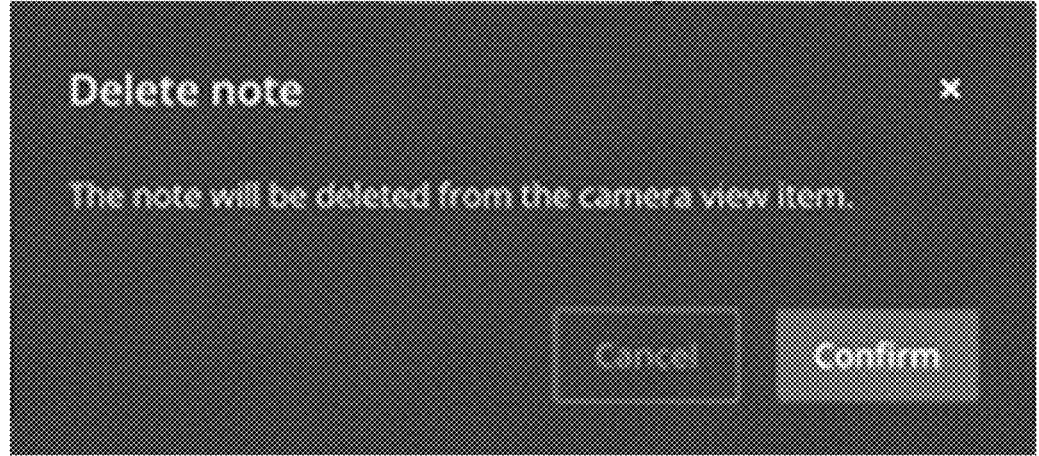

Preferably, upon clicking on the delete button, a delete window shown in FIG. 8 opens up. The delete window prompts the user to confirm whether to delete the note and corresponding note field.

It will be appreciated that the present disclosure is also not limited to the particular graphical elements 500 to 505 represented in FIGS. 5A to 8.

The invention claimed is:

1. A method of video surveillance comprising the steps of:
causing an instance of a video management system client application software to display live video data received from at least one server, the live video data being generated by a plurality of video surveillance cameras;
causing live video data from at least one of the video cameras to be blurred in that instance of the software upon receipt of, in that instance of the software, a blurring instruction sent from that instance of the software by a user and associated with the at least one of the video cameras and/or the video data of the at least one of the video cameras, wherein blurring is defined in and achieved by that instance of the software acting upon receipt of the blurring instruction;
causing the instance of the software to automatically revert to displaying non-blurred live video data from the at least one of the video cameras when a predetermined time period has expired; and
setting or changing the predetermined time period,
wherein the step of setting or changing the predetermined time period requires permission rights that are different from those required to send the blurring instruction.

2. The method according to claim 1, further comprising the step of:
manually reverting to displaying non-blurred live video data from the at least one of the video cameras before the predetermined time period elapses.

3. The method according to claim 1,
wherein the blurring instruction indicates a desired level of blurring.

4. The method according to claim 3, further comprising the step of:
causing the instance of the software to display a preview of blurred video data corresponding to the desired level of blurring which is being selected.

5. The method according to claim 4, further comprising the step of:
logging on an entry in a log of the blurring instruction.

6. The method according to claim 5, further comprising the step of:
reading or modifying the log,
wherein reading or modifying the log requires permission rights that are different from those required to send the blurring instruction.

7. The method according to claim 5,
wherein the log is stored in a video management server that is located between the plurality of video cameras and a computer running the instance of a video management system client application software.

8. The method according to claim 1, further comprising the step of:
recording the live video data from the video cameras in a non-blurred format in one or more recording servers, irrespective of the blurring instruction.

9. A non-transitory computer-readable storage medium storing a program for causing a computer to execute a computer-implemented method of video surveillance comprising the steps of:
causing an instance of a video management system client application software to display live video data received from at least one server, the live video data being generated by a plurality of video surveillance cameras;
causing live video data from at least one of the video cameras to be blurred in that instance of the software upon receipt of, in that instance of the software, a blurring instruction sent from that instance of the software by a user and associated with the at least one of the video cameras and/or the video data of the at least one of the video cameras, wherein blurring is defined in and achieved by that instance of the software acting upon receipt of the blurring instruction;
causing the instance of the software to automatically revert to displaying non-blurred live video data from the at least one of the video cameras when a predetermined time period has expired; and
setting or changing the predetermined time period,
wherein the step of setting or changing the predetermined time period requires permission rights that are different from those required to send the blurring instruction.

* * * * *